(12) United States Patent
Grinberg et al.

(10) Patent No.: US 7,273,669 B2
(45) Date of Patent: Sep. 25, 2007

(54) SPRAY-FORMED ARTICLES MADE OF PSEUDO-ALLOY AND METHOD FOR MAKING THE SAME

(75) Inventors: Grigoriy Grinberg, Sylvania, OH (US); Matthew M. Shade, Plymouth, MI (US); David Robert Collins, Saline, MI (US); Richard L. Allor, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 399 days.

(21) Appl. No.: 10/604,313

(22) Filed: Jul. 10, 2003

(65) Prior Publication Data

US 2005/0284599 A1    Dec. 29, 2005

Related U.S. Application Data

(63) Continuation of application No. 09/682,321, filed on Aug. 20, 2001, now Pat. No. 6,595,263.

(51) Int. Cl.
*B32B 15/00* (2006.01)
*C25D 5/10* (2006.01)
*B22D 23/00* (2006.01)

(52) U.S. Cl. .................. 428/937; 428/615; 428/658; 164/46; 164/271

(58) Field of Classification Search .............. 164/46, 164/271; 428/937, 615, 658
See application file for complete search history.

(56) References Cited

U.S. PATENT DOCUMENTS 3,947,607 A    3/1976   Gazzard et al.

4,971,838 A    11/1990  Hamamura et al.

(Continued)

FOREIGN PATENT DOCUMENTS

GB    1083003    9/1967

(Continued)

OTHER PUBLICATIONS

TAFA® (Thermal Spray Equipment and Supplies), Progress Report: Sprayed Metal Faced Plastic Tooling—© 1988, pp. 1-16, File: 2.5.1, TAFA Incorporated, Concord, N.H., USA.

(Continued)

*Primary Examiner*—Kevin Kerns
*Assistant Examiner*—I.-H. Lin
(74) *Attorney, Agent, or Firm*—Damian Porcari; Brooks Kushman P.C.

(57) ABSTRACT

Method and arrangement for spray forming an article. The method includes spraying a plurality of metal streams upon a low-heat resistant model and thereby forming a spray formed article. Each of the plurality of metal streams is composed of moltenized droplets, and as between the plurality of metal streams, each is composed of different constituent elements. In the spray form process, conditions of the metal streams are controlled, particularly around the time that the droplets land, to prevent adverse affects such as melting or burning the master model. The spray conditions are controlled in such a manner that the individual metal droplets forming the metal streams remain substantially segregate. The segregated state is maintained through out solidification so that the resulting spray formed article is composed at least partially of psuedo-alloy.

14 Claims, 5 Drawing Sheets

U.S. PATENT DOCUMENTS

| | | | |
|---|---|---|---|
| 4,992,337 | A | 2/1991 | Kaiser et al. |
| 5,424,101 | A | 6/1995 | Atkins |
| 5,464,486 | A | 11/1995 | Rao |
| 5,472,487 | A | 12/1995 | Chin et al. |
| 5,514,422 | A | 5/1996 | Mccune |
| 5,663,124 | A | 9/1997 | Rao |
| 5,817,267 | A * | 10/1998 | Covino et al. ............. 264/219 |
| 5,830,586 | A | 11/1998 | Gray |
| 5,875,830 | A | 3/1999 | Singer et al. |
| 5,922,412 | A | 7/1999 | Baughman et al. |
| 5,947,179 | A | 9/1999 | Kinane et al. |
| 5,958,520 | A | 9/1999 | Cook et al. |
| 5,964,395 | A | 10/1999 | Glovatsky |
| 5,983,495 | A | 11/1999 | Popoola et al. |
| 6,155,330 | A | 12/2000 | Kinane et al. |
| 6,190,740 | B1 * | 2/2001 | Rogers ....................... 427/446 |
| 6,216,765 | B1 | 4/2001 | Tseng et al. |
| 6,257,309 | B1 | 7/2001 | Kinane et al. |
| 6,595,263 | B2 * | 7/2003 | Grinberg et al. ............. 164/46 |

FOREIGN PATENT DOCUMENTS

WO     WO98/37252     8/1998

OTHER PUBLICATIONS

TAFA® (Thermal Spray Equipment and Supplies), Technical Data—Arc Sprayed Metal Molds & Tooling—© 1987, File 2.5.2.1, Issue No. C10818, pp. 1-7 and Figures 1-5, Concord, N.H., USA.

TAFA® (Thermal Spray Equipment and Supplies), Technical Data—TAFA TAFALOY® 204ME (Experimental) Mold Making Wire—© 1992, File 1.9.1.2-204ME, Issue 011206, pp. 1-4, TAFA Incorporated, Concord, N.H., USA.

Idaho National Engineering and Environmental Laboratory—"RSP Tooling"—(2 Pages), BP422KL-0399-1M-T.

Sprayform Tools and Dies Limited (STD), Video Transcript, Publication date at least as early as Sep. 1, 2000.

"Rapid Tooling—Changing the Face of Manufacturing"—Compact Disc Digital Data, dated Oct. 12, 2000., trt: 10:50.

TAFA® (Thermal Spray Equipment and Supplies), "Arc Spray 8830 System Manual"—Files 1.9.1.1.1 thru 1.9.1.2-205, © 1990-1992. TAFA Incorporated, Concord, N.H., USA.

Merle L. Thorpe and Joseph W. Minge, "Spray Metal Composite Tooling"—26th National SAMPE Symposium and Exhibition, vol. 26 (Society for the Advancement of Material and Process Engineering), Apr. 28-30, 1981, pp. 374 thru 382, Figures 1-14 and Tables I and II.

Walter A. Zanchuk & Leon J. Grant, TAFA Incorporated, Concord, New Hampshire—"The Use of Spray Metal Tooling for Metal Injection Molding"—. XP-001120122. pp. 25-34.

"Rapid Tooling, Changing the Face of Manufacturing—Compact Disc Digital Data," dated Oct. 12, 2000, TRT: 10:50.

* cited by examiner

FIG. 5D

SPRAY-FORMED ARTICLES MADE OF PSEUDO-ALLOY AND METHOD FOR MAKING THE SAME

CROSS REFERENCE TO RELATED APPLICATIONS

This application is a continuation of U.S. application Ser. No. 09/682,321 filed Aug. 20, 2001, which issued as U.S. Pat. No. 6,595,263 on Jul. 22, 2003 which is hereby incorporated by reference.

BACKGROUND OF INVENTION

There are many situations in which it is desired that a prototype or low-volume production tool be made from a master model constructed from relatively low heat-resistant material; that is, the material out of which the model is constructed either softens and/or melts at a relatively low temperature, or is combustible at comparatively low temperatures. Examples of such materials of construction for master models that would be desirably accommodated include wax, wood, plastic and similar materials.

It is known to use zinc alone in spray forming processes on such low heat-resistant materials, but the resulting tool is relatively soft because of its exclusive, or near-exclusive zinc content. As a result, tools of only very limited application may be formed in such a manner. These tools are normally limited to prototype applications because they do not possess sufficient durability to withstand even low-volume production manufacturing.

Conventional thermal spray form molding has utilized metals which require substantial energy input, which is typically manifest as heat energy, to moltenize and make the metal sprayable. Because of the high temperature of such a moltenized metal when it strikes the master model, the model has typically been required to be constructed from high heat tolerant material, such as ceramic, in order to survive the spraying of such molten metal thereupon. Because the original model is not typically cast directly in ceramic, multiple steps are required to finally establish a ceramic master model from one that has been constructed, for instance, by rapid prototyping methods such as stereo lithography, or which are constructed out of other types of low-heat resistant materials such as wood, wax and plastic laminate.

Because of the expense and delay associated with the usual multi-step process required to establish the ceramic master model, it is highly desirable to be able to perform spray form techniques directly upon the surface of an original model constructed from such rapid prototyping methods and low-heat resistant materials.

SUMMARY OF INVENTION

In at least one embodiment, the present invention takes the form of a method for spray forming an article, such as a low-volume stamping tool. The method includes spraying a plurality of metal streams upon a low-heat resistant model and thereby forming a spray formed article. Each of the plurality of metal streams is composed of moltenized droplets, and as between the plurality of metal streams, each is composed of different constituent elements. According to the invention, conditions of the metal streams are controlled, particularly around the time that the droplets first land, to assure that excessive heat energy contained therein is for all practical purposes, dissipated essentially immediately upon contact. In this way, if there is heat imposed on the model from the sprayed metal, it is sufficiently transitory that even low-heat resistant materials remain unaffected. The spray conditions are controlled in such a manner that the individual metal droplets forming the metal streams remain substantially segregate; that is to say, touching one another, but without intermixing across droplet surface boundaries. The droplets are held together based on mechanical adhesion that occurs when the semi-molten droplets come into contact with one another.

The segregated state is maintained through out solidification so that the resulting spray formed article is composed at least partially of psuedo-alloy; that is, commingled droplets of different elemental metals, but without intermixing into true alloys. The article may also be considered a psuedo-alloy based on a more global perspective; that is, the individual droplets may not be highly commingled, but different elemental deposits that are established in the spraying process are intermingled.

In another aspect, the invention includes the control of the relative proportions utilized of each of the metal streams that are differently composed on an elemental basis in a manner that institutes prescribed performance characteristics in the resulting spray formed article. In this way the qualities of the finished spray formed product can be manipulated to assure that the article is suitable for its intended use; as an example, as a spray formed stamping tool manufactured for use in low-volume production processes.

BRIEF DESCRIPTION OF DRAWINGS

The invention will now be described in greater detail in the following way of example only and with reference to the attached drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

As described herein, and as shown in the accompanying drawings, a common method for establishing thermal spray formed bodies utilizes two-wire arc gun technology. In such a gun 13, two metallic wires 28,28 or 31,31 are fed therethrough and sufficiently electrified so that an electric arc is established between the wires, one each acting as an anode 19 and cathode 22. The arc produced is of sufficient power to input enough heat energy to cause both wires 28,28 or 31,31 to be melted and become molten. Using air jets 16, the moltenized wire 28,31 is propelled in streams toward a target.

By conventional arrangement, each of the two wires 28,28 or 31,31 of the arc gun 13 are fed by a pair of rotating wheels that are commonly geared. As a result, the two wires 28,28 or 31,31 are fed at substantially the same rate through the arc. This makes it difficult, if not impossible, to feed two wires 28,28 or 31,31 in the same gun 13 that have substantially different physical properties, especially with respect to melting point. For instance, if one wire requires substantially more heat-energy to become molten than does the other, the wire with the higher heat requirement would necessarily have to be fed more slowly through the arc. Conversely, the wire of lower heat requirement for moltenization is often referred to as having a "quicker burn rate" than the higher melting point wire. The quicker burning wire with the lower melting point can actually burn backwards away from the arc toward the gun if the feed speed is geared for the slower burning, higher melting point wire. As a result, undesirable sputtering and misdirection of the molten metal can occur.

In order to take advantage of superior qualities that are produced in a tool resulting from thermal spray form techniques that utilize wires of different composition, the present invention employs a plurality of guns 13. That is to say, at least two guns 13 are utilized, but in a preferred embodiment, four guns 13 are utilized.

Figure 1:
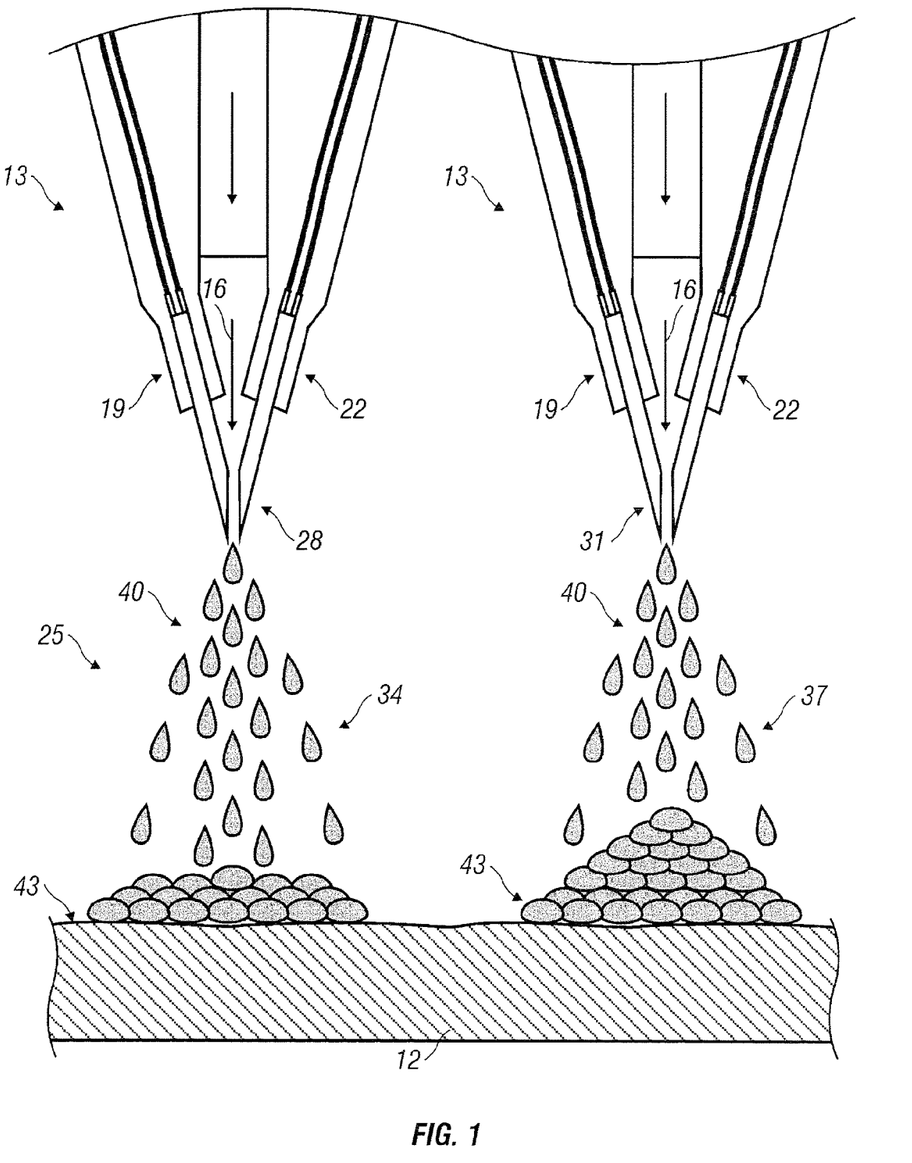
FIG. 1 a schematic representation of a spray form arrangement configured according to an embodiment of the present invention.
Figure 2A:
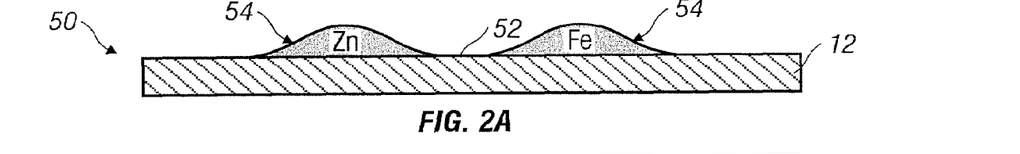
FIGS. 2A-2D illustrate depositional outcomes produced when a plurality of arc guns are aimed for adjacent, but spaced-apart depositional patterns according to the teachings of the present invention.
Figure 2B:
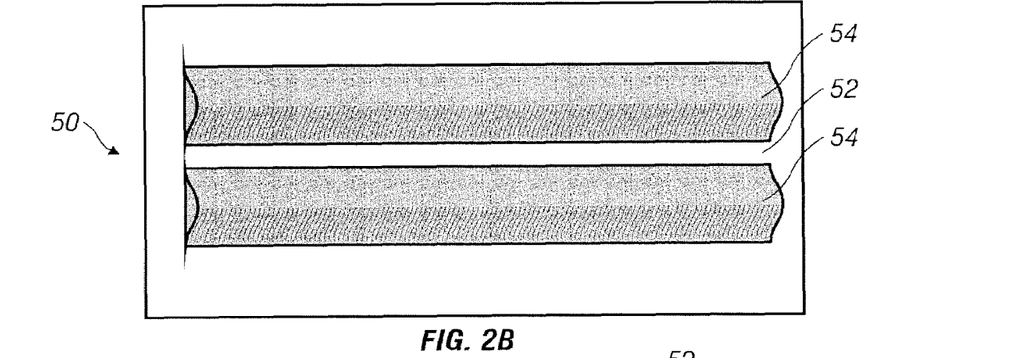

As background, the wire(s) 28 and 31 utilized in the present invention are supplied as off-the-shelf products. In addition to manufacturing wire that is comprised of predominantly one element as is utilized in at least one aspect of the present invention, these same suppliers normally also provide alloy wire, such as a zinc/copper combination that is effectively wire composed of the alloy brass. The composition of this type of alloy-wire is necessarily limited by the acceptable proportions for forming the alloy brass. The present invention, however, utilizes different metal-type wire 28 and 31 in each of the different guns 13, but the wires 28,28 or 31,31 in any given gun 13 are alike and often predominantly mono-elemental. As an example, in a two gun 13 arrangement as illustrated in FIG. 1, zinc wire 28 might be utilized in one gun 13 while copper or steel wire 31 is utilize in the other. Since an actual alloy is not prescribed to be formed according to the present invention, a much wider range of compositional combinations, as well as a wider array of possible resulting characteristics in the spray formed body are achievable. The guns 13 are shown to be at different depositional stages or volumetric rates; that is, more moltenized wire 31 has been deposited on the right than has been deposited on the left of the different type moltenized wire 28. It is contemplated that the depositional characteristics of simultaneously sprayed streams may vary volumetrically; they may also be volumetrically balanced as illustrated at least in FIG. 2A.

In one embodiment of the present invention, during the spraying process the two guns 13 are not directed at the same location, but are instead directed at points adjacent to one another as is shown in FIGS. 2A-2D. Resultingly, the two metals, exemplarily zinc and copper, can be configured to establish what amounts to predominantly separate stripes 54 of the respective metals as the guns 13 traverse the surfaces 43 upon which the molten metals are being deposited. Among others, it is for this reason that the resulting tool is described as being composed of a pseudo-alloy composite, and not an actual alloy such as brass as would be the case when taking zinc and copper as the examples.

By maintaining the metals in their segregated state, a broader range of qualities can be obtained therefrom than when using a true alloy. Referring again to the example of brass, that alloy can only be established within particular percentage ranges of zinc with respect copper. When maintained separately, the percentage composition of the resulting spray formed body may be composed of any combination ranging from predominantly zinc and little copper to predominantly copper and little zinc. In this way, the desired qualities of the two metals can be advantageously exploited to the fullest extent. Regarding comparable spray formed compositions, those desired qualities can include better tensile strength, better thermal conductivity, better hardness and better dimensional stability. At least in part, this better dimensional stability is accomplished by controlling stress that is induced in the resulting spray formed body. The goal of stress control can also be accomplished through the manipulation of the percentages of each of the different metal types utilized to establish the psuedo-alloy or composite spray formed body.

It should be appreciated that zinc is a preferred metal to be utilized in spray form techniques that are to be carried out on such master model substrates as wood, wax, plastic and other materials vulnerable to the high temperatures associated with conventional spray form techniques. The utilization of zinc is preferred because of that element's relatively low melting temperature. That is, if a high content of zinc is utilized, then a generally lower application temperature will be enabled at the master model.

A problem, however, with spray formed bodies having a high zinc composition is that they are relatively soft, as opposed to other sprayed metals, thereby preventing tools formed by such metals from being used in such applications as stamping tools for metal pieces in which harder materials of construction are required.

The melting point for zinc is approximately 450 degrees Celsius. Compared to other metals and alloys, however, this is a relatively low melting temperature. Resultingly, when the parameters at the spray gun 13 are properly controlled, after being moltenized in the gun's arc, the sprayed zinc 34 may be cooled to a temperature as low as 50 degrees Celsius as it travels away from the gun and immediately upon striking the master model substrate 12. At this temperature, the zinc is quasi-molten because it partially solidifies in flight, but it still readily forms a metallic bond with surroundingly deposited metals. Interestingly, a quasi-molten metal having a temperature as low as 50 degrees Celsius immediately after contact can actually be sprayed upon a person without causing harm or discomfort, thereby permitting the person to serve as a master model.

With regard to master models 12 constructed from such low-heat resistant materials as wax and plastic, or those established using stereo lithography, application temperatures below the 50-70 degree Celsius range will typically be satisfactory for conducting spray form techniques directly thereupon. The degree of cooling of the molten metal can be controlled by, among other parameters, adjusting the distance between the guns 13 and the master model 12; adjusting the type, temperature and/or volume of pressured gas supplied as the carrier for the moltenized metal; and the applied gun arc amperage and/or voltage. Still further, auxiliary cooling may be provided in the form of a cooling fan that directs a flow of ambient or cooled air upon the article being spray formed.

In ordered to combat the undesirable characteristics experienced when pure zinc is utilized in spray formed bodies that are intended to be utilized for prototype or rapid tooling applications, the present invention strategically incorporates other metals thereby forming a composite pseudo-alloy body. As discussed hereinabove, the establishment of the composite is accommodated by the use of multiple guns 13 which can be independently controlled. The present invention appreciates the utility of incorporating steel 37 or copper 37 together with the zinc 34 for obtaining a harder and stronger spray formed body or tool. Each of these metals, however, have substantially higher melting points than does zinc 34. Therefore, there is a limit to the percentage content of these non-zinc metals 37 that can be incorporated. The two competing parameters that must be balanced is the desire for a high content of the non-zinc metal(s) 37 for hardness and durability in the resulting tool versus low application temperature at the master model 12 that is primarily enabled by high zinc content.

The compositional layering enabled by spray form techniques may also be advantageously exploited. In order to accommodate the necessarily low temperature required at the surface 43 of a master model substrate 12 made exemplarily from wax, a high content zinc layer may be initially sprayed upon the master model 12, with an increasingly higher non-zinc metal content being subsequently applied in the build-up layers. It is within these subsequent layers that the pseudo-alloy is predominantly established. The layers are in fact quite thin and there can be a degree of intermix between adjacent layers.

The present invention advantageously manipulates these spray-variables for increasing the hardness, strength and durability of a tool manufactured by the instant spray form techniques, while at the same time, minimizing internal stress within the tool body. By minimizing the internal stress either by avoiding original inducement of stress (stress-free) or by negating/canceling internal stresses within the body (no-stress), shape-distortion in the finished article is avoided. This can be especially important as between the multiple built-up layers in order to avoid warping of the article. Minimized stress is also desirable in order to prevent the spray formed body from tending to pull away from the master model substrate 12.

One way for controlling the stress in a spray formed body is to control the temperature at which the molten metal is first applied to the master model substrate 12, and also in the subsequent layers as the body is built up. The general goal is to minimize the differential between the temperature at which the molten metal 34,37 strikes the body and the temperature to which it ultimately cools. By minimizing this differential, there is a minimized degree of contraction due to cooling.

In practice, the spray guns 13 may be moved back and forth across the article being spray formed in substantially straight lines so that "stripes" of the respective sprayed metals 34,37 are established. In some instances, commingled bands of pseudo-alloy are established therebetween. After a layer or one series of stripes has been completed, the master model substrate 12 may be indexed to a transverse position, exemplarily to approximately 90 degrees from which a perpendicular stripe pattern is established in the subsequent application or layer. By establishing such lattice configurations between the layers, at least some of the stress that is induced is compensated for by the opposed patterns and fosters the desired no-stress characteristics in the resulting spray formed body.

The internal stresses of the established spray formed article are also controlled by varying the relative volumetric applications of the different metals 34,37 as exemplarily shown in FIG. 1. For instance, some metals will create contractive forces within the finished product as a result of cooling, while others will experience expansion due to transformations upon cooling and impose compactive effects within the body. By purposeful manipulation, the relative quantities among the several metals 34,37 being applied from the different guns 13 can be adjusted so that as close to zero stress results in the finished article as possible. Additionally, this minimization of stress insures that the spray formed article does not pull away from the master model 12 during the cooling process.

Through the course of experimentation, preferred ranges for both droplet 40 landing temperature and elemental composition of a finished article have been discovered. In trials, pseudo-alloys have been created using zinc 34 and copper 37, as well as zinc 34 and steel 37. With respect to each combination, a target temperature of 50 degrees Celsius has been identified, with an acceptable range being defined thereabout from 32 degrees Celsius to 60 degrees Celsius. For zinc and copper (Zn/Cu) and zinc and steel (Zn/Fe) combinations, a particularly advantageous range of constituent composition percentages, measured on a by-weight basis, has been identified as ranging between 60/40 and 54/46. These compositions have rendered hardness values in the range of 60 to 68 for the zinc and copper combination and 85 to 95 for the zinc and steel combination. For comparison purposes, it should be appreciated that zinc alone would have a hardness value of 46 to 52 on the utilized scale for this same application temperature range. In the present example, the steel utilized in the zinc and steel combination is an off-the-shelf product that contains 0.8 carbon steel.

Regarding the goals of spray form techniques according to the present invention, there are several areas of suitable utilization. One group is prototype stamping tools, low-volume production stamping tools and certain mass production stamping tools. The resulting tools can, however, be relatively soft as compared to tools constructed from true alloys and are typically not suited for long-range continuous mass production metal stamping processes. They are, however, especially suited for utilization in plastic blow molding processes, plastic injection molding processes, and as serving as lay-up tools utilized in aircraft construction. In these latter cases, sufficient hardness is easily established using the pseudo-alloys of zinc described herein having steel, copper and/or similar elements added thereto.

As intimated hereinabove, in at least one embodiment the present invention takes the form of a method for spray forming an article. The method includes spraying a plurality of metal streams 25 upon a low-heat resistant model 12 and thereby forming a spray formed article. Each of the plurality of metal streams 25 is composed of moltenized droplets 40, and as between the plurality of metal streams 25, each is composed of different constituent elements. In the spray form process, conditions of the metal streams 25 are controlled, and particularly around the time that the droplets 40 strike first, the exterior receiving surface 43 of the model 12, and then the exposed outside surfaces 43 of the sequential metal layers as they are built-up in the spray form process. The spray conditions are controlled in such a manner that the individual metal droplets 40 forming the metal streams 25 remain substantially segregate; that is to say, touching one another, but without intermixing across droplet surface boundaries. The segregated state is maintained through out solidification so that the resulting spray formed article is composed at least partially of psuedo-alloy; that is, commingled droplets 40 of different elemental metals, but without intermixing into true allows. In this manner, the droplets 40 are held together based on mechanically adhesion occurring when the semi-molten droplets 40 come into contact with one another. In another aspect, the invention includes the control of the relative proportions utilized of each of the plurality of metal streams 25 in a manner that institutes prescribed performance characteristics in the spray formed article thereby assuring that the spray formed article is suitable for intended use.

In practice, feed-wire 28 or 31 is fed respectively to arc guns 13 that establish the plurality of metal streams 25. The feed-wires 28,31 are selected so that one pair of wire strands 28 going to one gun 13 is composed predominantly of zinc metal and another pair of wire strands 31 going to the other gun 13 are composed predominantly of non-zinc metal. In a preferred embodiment, the predominantly non-zinc metal feed-wire 31 has sufficient amounts of steel, copper or other suitable metal to establish a wear resistant mold that can be used in such manufacturing processes as blow molding and/or injection molding. Still further, a low-volume stamping tool may be similarly spray formed.

The relative proportions may be manipulated and varied between the plurality of metal streams 25 with regard to elemental constituent make-up during the spraying process. In this way, the user can tailor the characteristics of the spray formed article for custom applications.

Varying the elemental make-up can also be used to establish a no-stress spray formed article through manipulating the relative proportions of the plurality of metal streams 25 to cancel out any induced stress. Similarly, a stress-free spray formed article may be formed through control of the relative proportions of the different constituent elements.

Figure 2C:
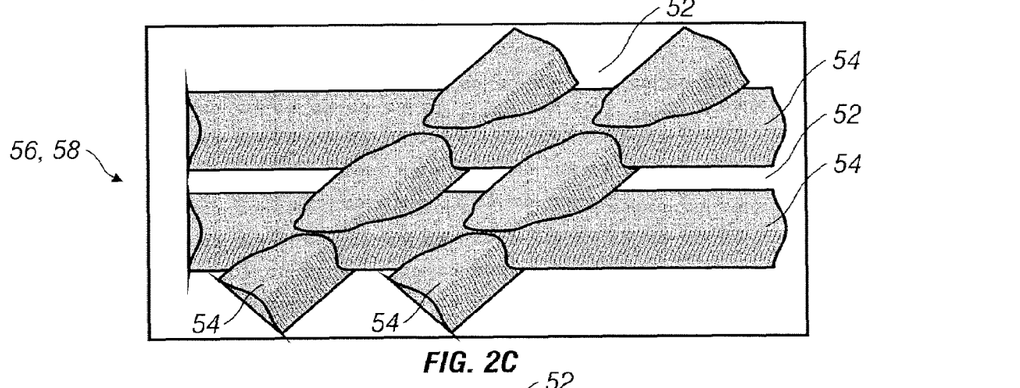
Figure 2D:
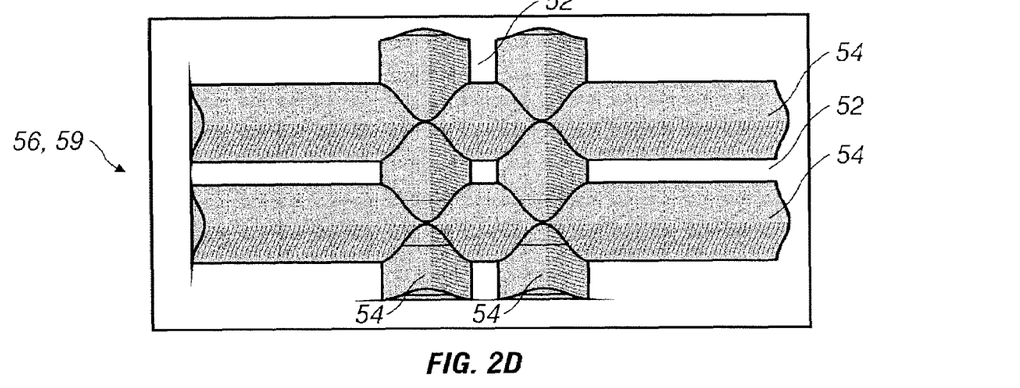
Figure 3A:
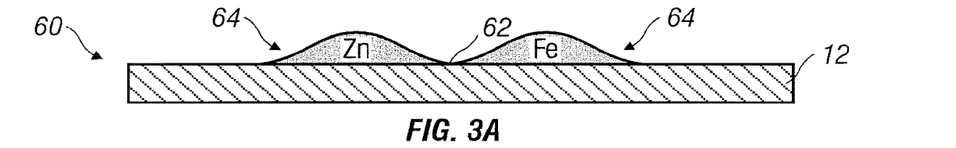
FIGS. 3A-3D illustrate depositional outcomes produced when a plurality of arc guns are aimed for segregated, but touching depositional patterns according to the teachings of the present invention.
Figure 3B:
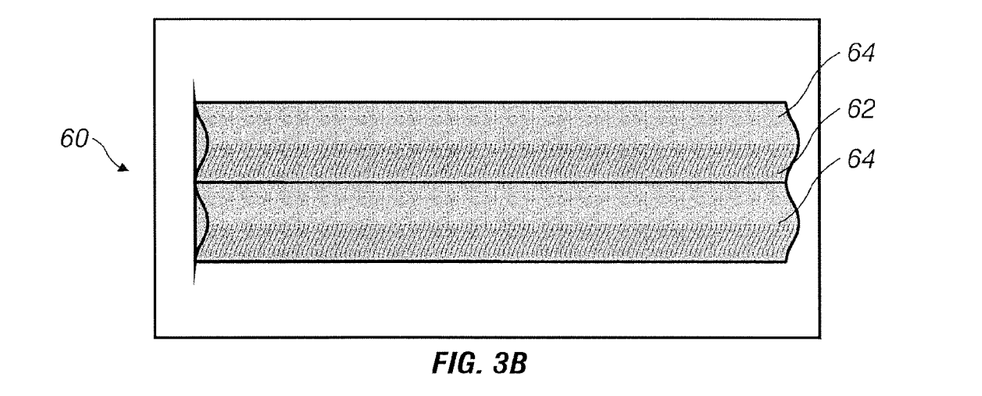
Figure 3C:
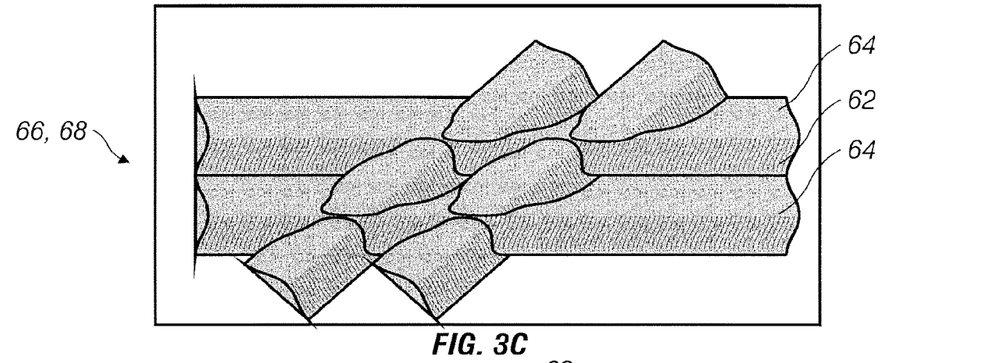
Figure 3D:
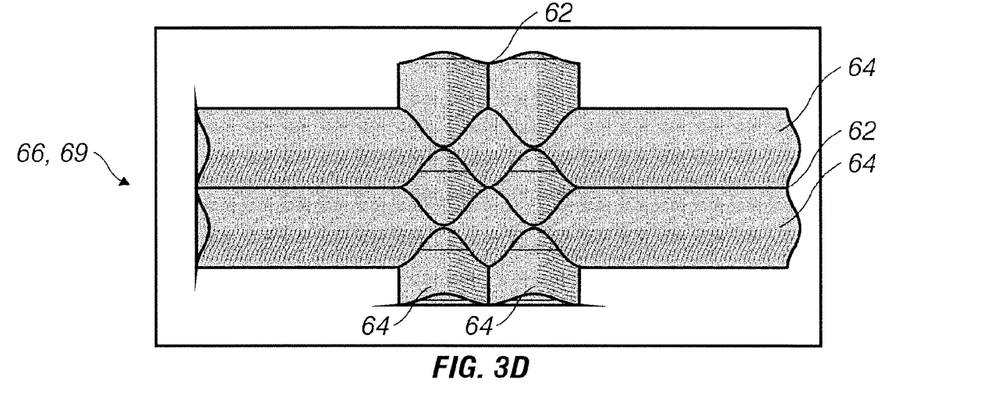
Figure 4A:
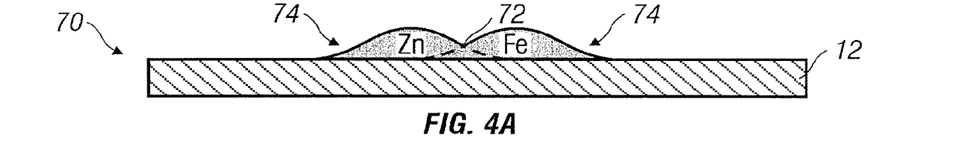
FIGS. 4A-4D illustrate depositional outcomes produced when a plurality of arc guns are aimed for overlapping depositional patterns according to the teachings of the present invention.
Figure 4B:
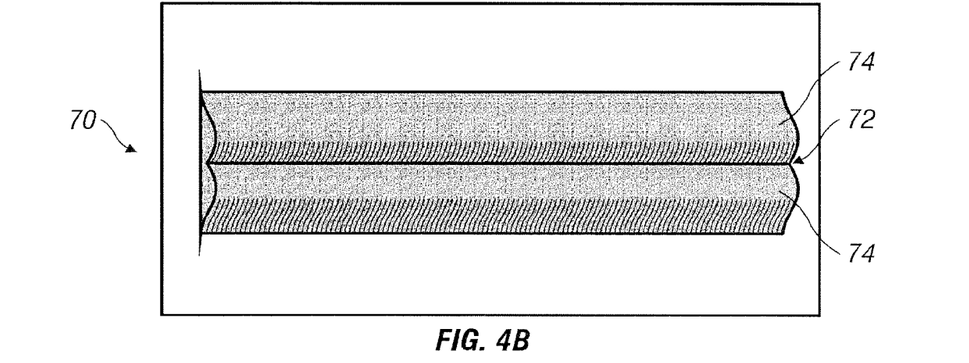
Figure 4C:
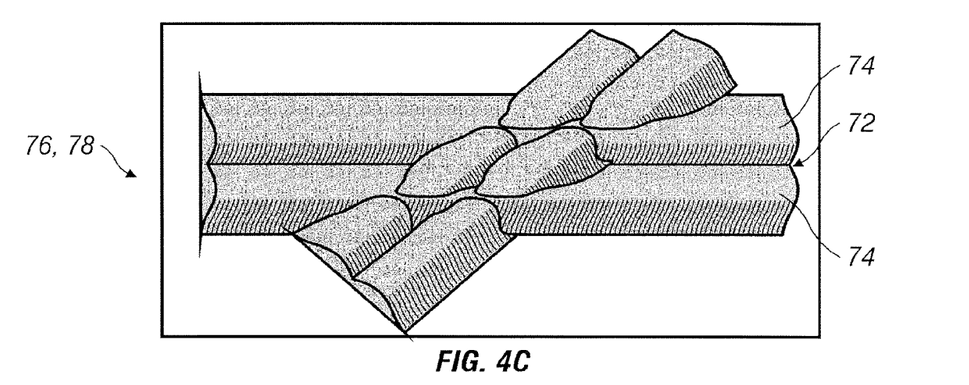
Figure 4D:
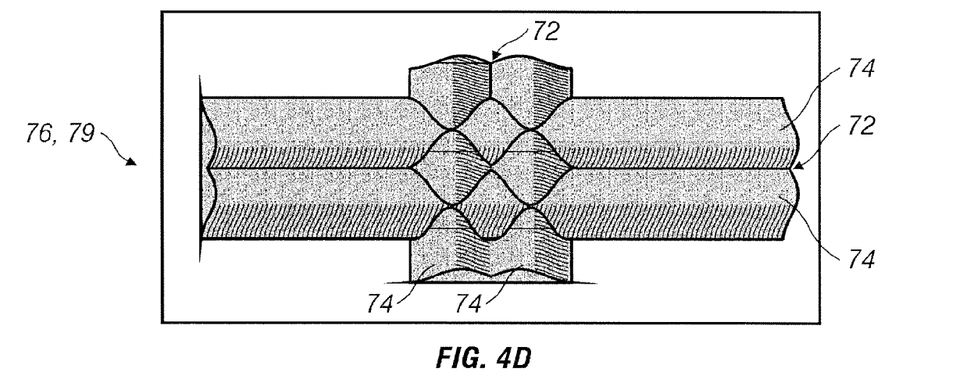
Figure 5A:
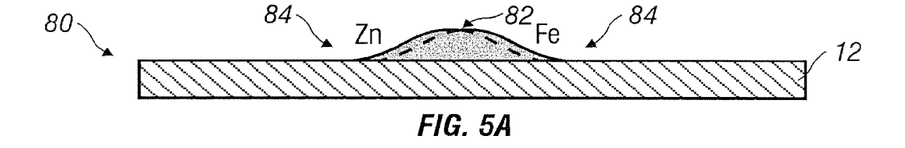
FIGS. 5A-5D illustrate depositional outcomes produced when a plurality of arc guns are aimed for substantially commingled depositional patterns according to the teachings of the present invention.
Figure 5B:
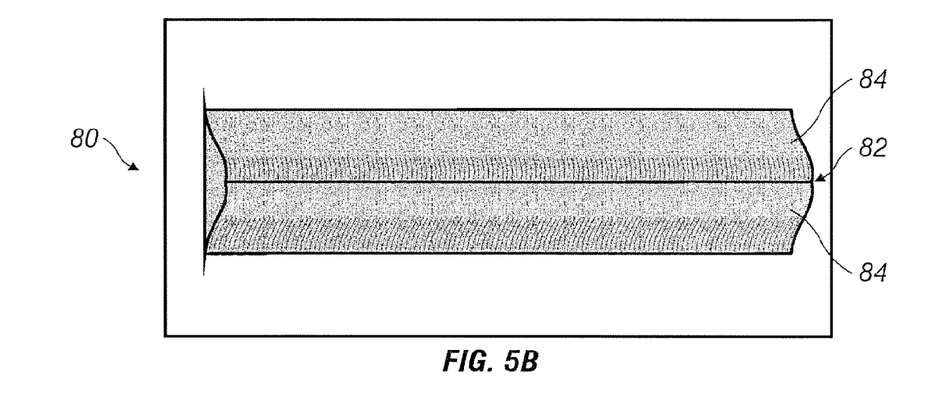
Figure 5C:
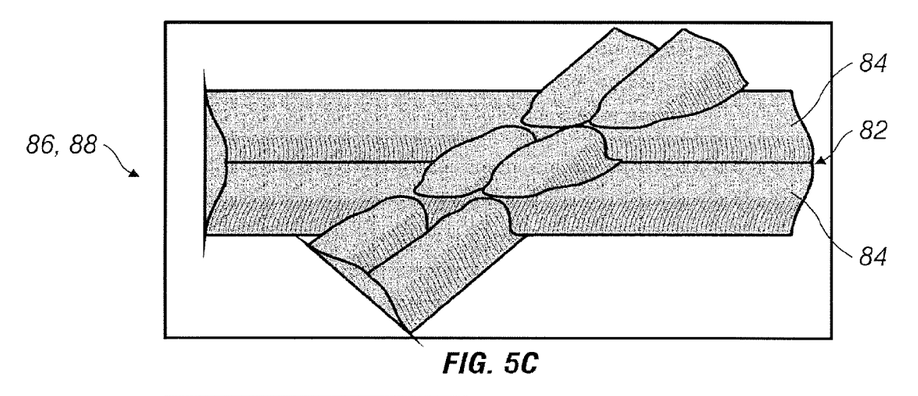
Figure 5D:
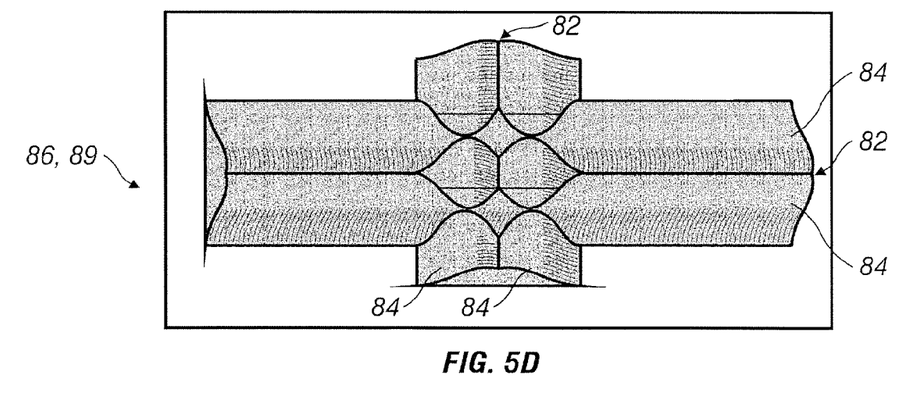

In one practice according to the present invention which is illustrated in FIGS. 2A-2D, each of the plurality of metal streams 25 is aimed at different, but adjacent locations on the spray formed article. In such a spaced configuration 50, these different, but adjacent locations on the spray formed article are spaced sufficiently far apart that a gap-space 52 is maintained between simultaneously sprayed metal streams 34,37. Throughout the process, each of the plurality of metal streams 25 is sprayed across the spray formed article so that discrete metal stripes 54 are formed on the exposed receiving surfaces 43. These surfaces 43 include not only the exterior surface 43 of the master model 12, but also the exposed surface 43 of each subsequent layer of spray formed metal that is applied thereto. The metal stripes 54 are spaced apart so that parallel and discrete metal stripes 54 with essentially no overlap therebetween are established across the spray formed article. As indicated above, the orientation of the model 12 may be altered prior to a subsequent layer's application, or the guns 13 may be manipulated in a crosswise direction to the previous. In either event, the parallel and discrete metal stripes 54 of sequential layers are applied in a lattice configuration 56 for minimizing stress-induced shape distortion in the finished spray formed article. The angle at which the lattice configuration is established may vary, therefore, within an acceptable range, the cross-wise metal stripes may be longitudinally transversely oriented as shown in FIG. 2C in which a transverse lattice configuration 58 is established. In one particularly preferred embodiment, the orientation of the crossing metal stripes is perpendicularly oriented as shown in FIG. 2D thereby establishing a perpendicular lattice configuration 59.

In an exemplary embodiment, the non-zinc feed-wire 31 is comprised of sufficient amounts of steel to establish the spray formed article as a low-volume stamping tool. The wire strands 31 are chosen so that it has sufficient amounts of the non-zinc metal, exemplarily steel, to establish a spray formed article capable of being used as a low-volume stamping tool.

As indicated above, but for clarity within the context of the teachings of the method(s) of the present invention, application conditions regarding the plurality of metal streams 25 are controlled so that immediately upon striking the exposed receiving surfaces 43, the metal droplets 40 have a temperature ranging from approximately 32 degrees to 60 degrees Celsius thereby avoiding softening and combusting a low-heat resistant model 12. A preferred temperature has been found to be approximately 50 degrees Celsius, which avoids softening, and/or combusting a low-heat resistant model 12.

In one configuration that is illustrated in FIGS. 3A-3D, the aiming of the metal streams 25 causes a segregation interface 62 to be established between the simultaneously sprayed metal streams 25. There is essentially no overlap between the simultaneously sprayed plurality of metal streams 25. As the metal is sprayed across the spray formed article, segregated, but interfacing metal stripes 64 are formed. An interfaced relationship 60 is maintained between the metal stripes 64 so that the parallel metal stripes 64 touch one another, but there is essentially no overlap between the metal stripes 64. As in the spaced apart embodiment, the parallel metal stripes 64 may be arranged into a lattice configuration 66 that may be transverse 68 or perpendicular 69 for minimizing stress-induced shape distortion in the finished spray formed article.

In an alternative execution of the method of the present invention demonstrated in FIGS. 4A-4D, an overlapping interface 72 may be established between simultaneously sprayed metal streams thereby establishing an interposed psuedo-alloy zone. During the spray process, an overlapped inter-relationship or configuration 70 is maintained between overlapping metal stripes 74 so that the parallel metal stripes 74 overlap one another thereby establishing an interposed psuedo-alloy stripe-zone 72. As in the other embodiments, the overlapping metal stripes 74 may also be arranged into a lattice configuration 76 that may be transverse 78 or perpendicular 79 for minimizing stress-induced shape distortion in the finished spray formed article.

FIGS. 5A-5D show yet another possible execution of the present invention in which a substantially commingled configuration 80 is established having a commingled interface 82 formed by commingled metal stripes 84. In this configuration, the target location for each of the spray streams 25 is substantially identical, but possibly with a slight offset. As with the other embodiments, the commingled metal stripes 84 may also be arranged into a lattice configuration 86 that may be transverse 88 or perpendicular 89 for minimizing stress-induced shape distortion in the finished spray formed article.

A method for establishing a dimensionally stable spray formed article has been variously described. These and other variations, which will be appreciated by those skilled in the art, are within the intended scope of this invention as claimed below. As previously stated, detailed embodiments of the present invention are disclosed herein; however, it is to be understood that the disclosed embodiments are merely exemplary of the invention that may be embodied in various forms.

The invention claimed is:

1. A spray formed article, the article comprising:
a body comprising a composite spray formed body portion comprising a configuration of particles comprising a first plurality of sprayed metal particles, a second plurality of sprayed metal particles substantially segregate from the first plurality of metal particles, and a pseudo-alloy interposing the first and second plurality of sprayed metal particles, the first plurality of metal particles being composed of a first metal, the second plurality of metal particles being composed of a second metal, different from the first metal, and the pseudo-alloy being composed of the first and second metals, wherein the first metal comprises zinc or zinc-alloy and the second metal comprises a predominantly non-zinc metal, wherein the composite spray formed body portion includes a first surface including a first portion being comprised of the first metal, a second portion being comprised of the second metal and a third portion being comprised of the pseudo-alloy and interposed between the first and the second portions of the first surface, and a second surface opposing the first surface and including a first portion being composed of the first metal and a second portion being comprised of the second metal.

2. The spray formed article of claim 1, wherein particles of the first and second plurality of metal particles are commingled but not mixed into an alloy.

3. The spray formed article of claim 2, wherein the first metal has a lower melting point than the second metal and wherein the second metal comprises sufficient amounts of copper to establish the spray formed article as a wear resistant molding form.

4. The spray formed article of claim 2, wherein the first metal has a lower melting point than the second metal and wherein the second metal comprises sufficient amounts of steel to establish the spray formed article as a low-volume stamping tool.

5. The spray formed article of claim 2, further comprising a minor body portion, adjacent the spray formed portion, the minor body portion substantially comprising the first metal.

6. The spray formed article of claim 1, wherein the pseudo-alloy is comprised of a pseudo-alloy zone.

7. The spray formed article of claim 6 wherein the pseudo-alloy zone is comprised of, substantially segregated, substantially commingled, metal particles of the first and second metal, the pseudo-alloy zone having a greater ratio of first metal particles to the second metal particles than the ratio of first metal particles to the second metal particles in the spray formed body portion.

8. The spray formed article of claim 1, wherein at least a portion of the metal particles comprise a first plurality of first stripes being comprised of the first metal a second plurality of second stripes being comprised of the second metal, and a third plurality of third stripes being comprised of the first and second metals.

9. The spray formed article of claim 8, wherein at least one of the first plurality of metal stripes is adjacent at least one of the third plurality of third stripes.

10. The spray formed article of claim 8, wherein the first plurality of stripes comprises a first matrix of spaced apart stripes and the third plurality of stripes comprises a third matrix of spaced apart stripes, at least a substantial number of the stripes of the third matrix of stripes having a stripe of the first matrix of stripes extending adjacent to and along each side of the stripe of the third matrix of stripes.

11. The spray formed article of claim 10, wherein there are substantially no discrete gaps extending between the stripes of the first and third matrices.

12. The spray formed article of claim 8, wherein the configuration is configured such that crossing metal stripes are longitudinally transversely oriented.

13. The spray formed article of claim 1, wherein the article comprises a forming tool.

14. The spray formed article of claim 1, wherein the particles are held together by mechanical adhesion.

* * * * *